Oct. 10, 1944.  J. H. NEHER  2,360,151
PROTECTIVE SYSTEM
Filed May 14, 1942  2 Sheets-Sheet 1
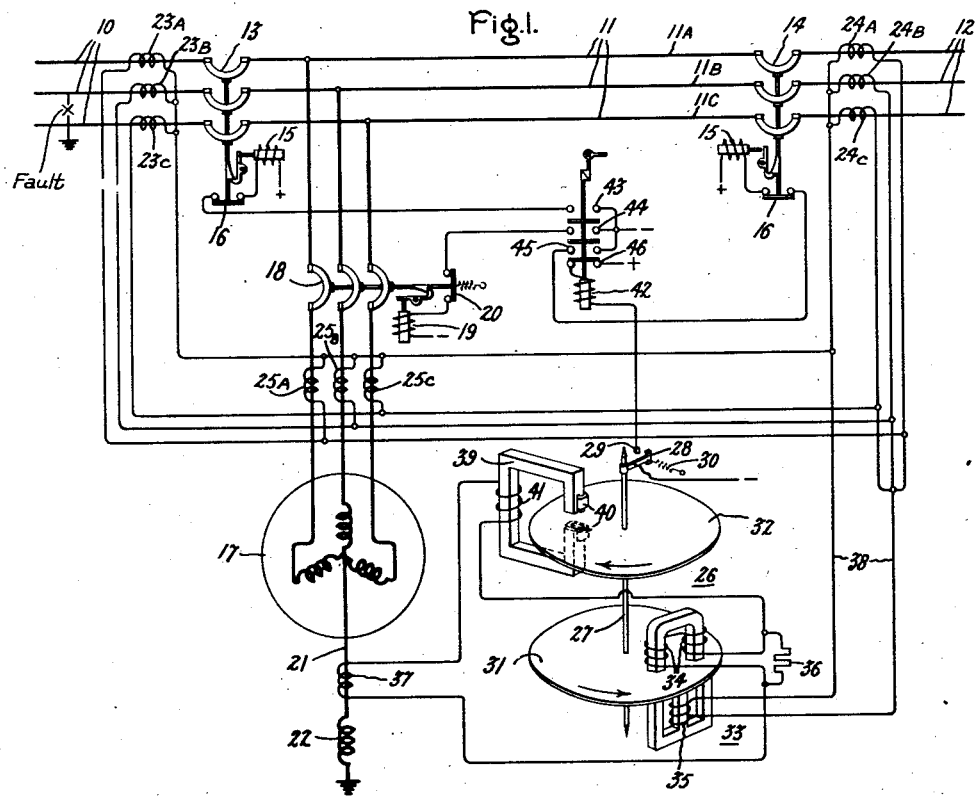
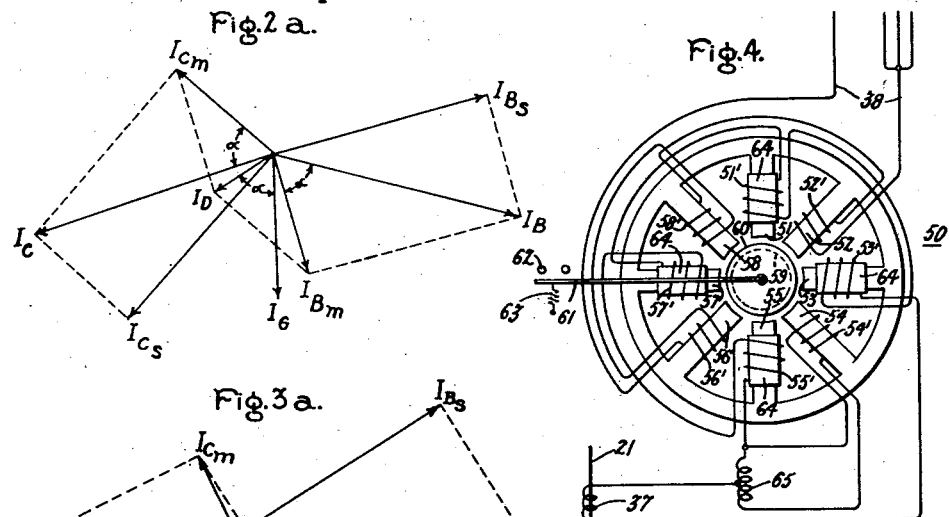
Inventor:
John H. Neher,
by Harry E. Dunham
His Attorney.

Oct. 10, 1944.    J. H. NEHER    2,360,151
PROTECTIVE SYSTEM
Filed May 14, 1942    2 Sheets-Sheet 2
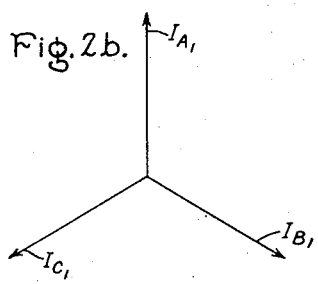
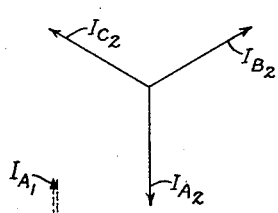
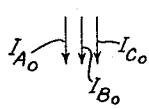
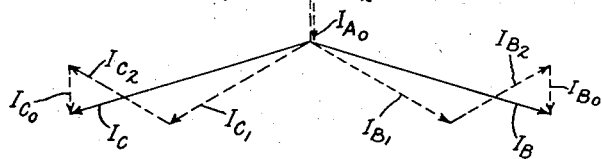
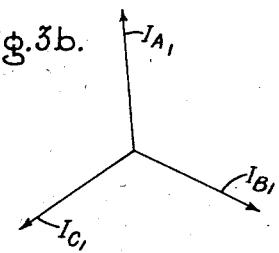
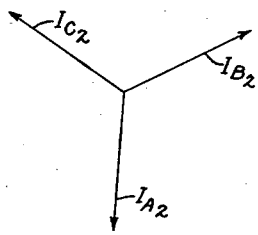
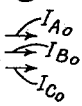
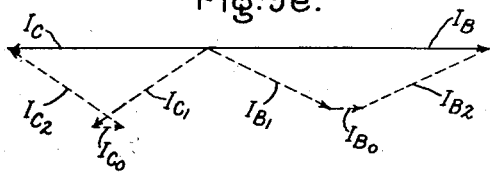
Inventor:
John H. Neher,
by Harry E. Dunham
His Attorney.

Patented Oct. 10, 1944

2,360,151

UNITED STATES PATENT OFFICE 2,360,151

PROTECTIVE SYSTEM

John H. Neher, Wynnewood, Pa., assignor to General Electric Company, a corporation of New York Application May 14, 1942, Serial No. 442,883

8 Claims. (Cl. 175—294)

My invention relates to protective systems and it has particular relationship to ground-fault differential protective systems, such as might be employed for protecting power station buses.

Differential protection of buses, for example, against both ground faults and phase faults has been used successfully for some time, particularly on solidly grounded systems. However, it has been discovered that ground faults on solidly grounded systems often entail such large current values that considerable damage is done and, to this end, a grounding impedance has been employed which may be either a resistance or a reactance to limit the current which may flow in the event of ground faults.

If the ground fault current is limited or greatly reduced by a ground-fault impedance, then two distinct fault current levels may be involved for the complete protection of a power bus, one for phase faults and another for single phase-to-ground faults It will be obvious that, if a ground fault impedance is used substantially limiting the ground current which may flow, a relatively sensitive differential ground-fault relay must be utilized to provide differential ground fault protection for the bus. Heretofore, the use of a differentially connected sensitive ground-fault relay has been objectionable due to the possibility of its operation on false differential currents which may appear on through or external faults due to current transformer breakdown or errors in these transformers. Since the false differential current produced by a through phase fault enters the differentially connected ground relay from one side only, the percentage restraint which can be successfully applied to phase relays to prevent false operation thereof under such conditions is inapplicable and it is necessary to resort to a complicated arrangement for preventing such false operation or to dispense with ground protection entirely as is sometimes the case.

Accordingly, it is an object of my invention to provide a new and improved differential relay for protection against ground faults on an electrical circuit, such as a bus, which is very sensitive and yet will not operate falsely on false differential currents.

It is another object of my invention to provide a new and improved ground-fault differential protective system in which no operating torque is produced unless an actual ground fault exists on the protected system.

It is still another object of my invention to provide a ground-fault differential protective system employing a differential relay in which the operating torque is produced due to the interaction of a flux proportional to the differential current and a flux proportional to a polarizing current so that advantage of the angular relationship of the differential current and the polarizing current on true and false differential currents may be utilized to distinguish between the same and prevent operation on false differential currents.

Further objects and advantages of my invention will become apparent as the following description proceeds and the features of novelty which characterize my invention will be pointed out with particularity in the claims annexed to and forming a part of this specification.

For a better understanding of my invention, reference may be had to the accompanying drawings in which Fig. 1 illustrates schematically a differential ground-fault protective system embodying my invention, Figs. 2a, 2b, 2c, 2d, 2e, 3a, 3b, 3c, 3d, and 3e are vector diagrams to aid in understanding my invention, and Fig. 4 is a partial view of a system similar to Fig. 1 illustrating a modification of my invention.

Referring now to Fig. 1 of the drawings, I have illustrated my invention as applied to a polyphase alternating-current sectionalized bus system of which three sections 10, 11, and 12 are schematically illustrated. Only one section 11 is shown completely since the others are substantial duplicates as far as my invention is concerned. Although I have illustrated my invention as specifically applied to a bus system, it will be understood by those skilled in the art that other applications are also possible, the bus system having been chosen by way of example only. Bus section 11 is illustrated as a three-phase bus including phase conductors 11A, 11B, and 11C. The bus sections 10, 11, and 12 are shown as interconnected by suitable circuit control devices or switching means such as latched closed circuit breakers 13 and 14, each provided with trip coils 15 and an auxiliary switch 16, which is closed when the circuit breaker is closed and open when the circuit breaker is open. Such auxiliary switches are commonly known as "a" switches.

Each bus section, such as 11, for example, may have one or more sources of supply, which I have indicated as a Y-connected generator 17, connected to bus section 11 through a switching means, such as latched closed circuit breaker 18 having a trip coil 19 and an auxiliary or "a" switch 20. The neutral of Y-connected generator 19 is provided with a suitable ground connection 21 including a ground-fault current-limiting impedance 22 which has been illustrated as a reactance but which might equally well be a resistance as will be set forth in greater detail hereinafter. My invention as will become obvious from the description included hereinafter, presupposes that a sufficient amount of ground current for relaying purposes is supplied by a grounding device including a ground connection such as 21 which is directly associated with the protected bus section. However, since this is almost always the case my protective system is substantially universally applicable.

It will be understood that a plurality of feeders, not shown, will also be connected with bus section 11 through suitable switching means but, since my invention may be understood without a discussion thereof, they have been omitted from the drawings for the purpose of simplicity.

Since my invention is particularly concerned with differential ground-fault protection, I have not illustrated the protective apparatus for bus section 11 necessary to protect it against interphase faults occurring thereon. It should be understood that such a protective system would also be provided except in those cases where the bus section is of the so-called "isolated phase type" where the possibility of interphase short circuits is so remote that a protective system for this purpose might not be necessary.

If a fault should occur on bus section 10, on bus section 12, in generator 17, or in any other circuit connected to bus section 11, in other words, an external fault, it is desirable to disconnect such faulted circuit, device, or apparatus from protected bus section 11. In order to operate switching means 13, 14, and 18 to isolate bus section 11 in the event of a ground-fault thereon through operation of a differential ground-fault relay, each of the phase conductors of the bus system at either end of protected section 11 is provided with a current transformer. The current transformers associated with the phase conductors of the bus system adjacent the junction between bus sections 10 and 11 are designated as 23A, 23B, and 23C, respectively, while the current transformers adjacent the junction of bus sections 11 and 12 are designated as 24A, 24B, and 24C, respectively, the subscripts denoting the A, B, or C phase conductor with which they are associated. All feeder and supply circuits connected to bus section 11 are also provided with current transformers and, accordingly, as shown in Fig. 1, current transformers 25A, 25B, and 25C are provided for the respective phase conductors of the supply circuit by which generator 17 is connected to bus section 11.

My invention is particularly concerned with protection against ground faults occurring on bus section 11 and, under such a ground fault condition, it is necessary completely to isolate this section from the rest of the system by simultaneously tripping sectionalizing circuit breakers 13 and 14, circuit breaker 18 by which generator 17 is connected to bus system 11, and any other circuit breakers for controlling source or feeder circuits connected to bus section 11. In view of the ground-fault impedance 22, the ground-fault currents are reduced so that a sensitive differential ground-fault relay is required and, to this end, I provide an electroresponsive device generally indicated at 26, which is a sensitive differential ground-fault relay constructed and energized in accordance with my invention.

Differential ground-fault relay 26 may be any of the well-known types of differential relays insofar as the general structure is concerned; for example, it may be of the balanced-beam type, of the induction-cup type, or, as illustrated in Fig. 1, the induction-disk type. As will be understood by those skilled in the art, the operating and restraining torques applied to the movable member of an induction-disk type of differential relay may both be applied to a single disk or, as illustrated in Fig. 1, may be applied to separate disks mounted on a common shaft. Accordingly, in Fig. 1, sensitive differential ground-fault relay 26 is illustrated as comprising a rotatable shaft 27 controlling a movable contact-controlling member 28 adapted to engage a contact 29. As will be described hereinafter, contact-controlling member 28 and contact 29 are connected in a trip-controlling circuit capable of causing simultaneous opening of switching devices 13, 14, and 18. A suitable spring 30 is provided for constantly biasing rotatable shaft 27 in such a direction as to move contact controlling member 28 away from contact 29 or, in other words, to tend to maintain the trip-controlling circuit in the open or unenergized condition.

In order that certain torques may be applied to rotatable shaft 27 of sensitive differential ground-fault relay 26 for causing or preventing operation thereof, I have provided a plurality of disks 31 and 32 rigidly attached in spaced relationship to shaft 27. An operating torque for causing contact 29 to be engaged by contact-controlling member 28 in response to a ground-fault on bus section 11 is obtained by means of an operating circuit which controls the energization of a motor element comprising a magnetic structure of the well-known wattmeter type generally indicated at 33 having windings 34 and 35 arranged so as to produce a torque on disk 31 proportional to the product of the currents flowing in windings 34 and 35 and in an operating direction as indicated by the arrow on disk 31. A suitable phase-splitting impedance 36 may be provided across windings 34 to give the desired phase-angle characteristic for substantially optimum torque conditions. In order to be sure that no operating torque is applied to cause operation of electroresponsive device 26 and consequent isolation of bus section 11 unless an actual ground fault exists somewhere on the system, windings 34 which are hereinafter referred to as polarizing windings, are energized in response to the actual ground current flowing in ground conductor 21 and, to this end, a current transformer 37 is provided, the primary winding of which is connected in series with the ground conductor 21 associated with generator 17 while the secondary winding is connected to supply polarizing windings 34 with the ground current $I_G$. Since the torque produced by motor element 33 is dependent upon the product of currents flowing in windings 34 and 35, no operating torque will be produced unless a current flows in polarizing windings 34 and, consequently, false operation of electroresponsive device 26 on faults not involving ground is completely eliminated.

The winding 35 of the wattmeter type motor element 33 is energized with the differential current $I_D$, which is proportional to the vector sum of all the currents entering and leaving bus section 11 by any circuit associated therewith. For the particular circuit illustrated in Fig. 1, the current transformers designated by the subscript A, namely, current transformers $23_A$, $24_A$, and $25_A$, are connected in parallel with one another as are also the secondary windings of the current transformers designated by the subscript B and also the current transformers designated by the subscript C. These three parallel circuits then are all connected in parallel by differential conductor 38 so that any differential current whether due to an actual fault or due to dissimilarities in the current transformers will flow through conductor 38 and consequently winding 35 of motor element 33.

Theoretically, no differential current $I_D$ should flow through operating winding 35 of motor element 33 unless an actual ground fault occurs on bus section 11. However, as a practical matter due to ratio errors of the current transformers or for other reasons, some differential current will flow even under normal conditions and a large differential or apparent fault current may flow under heavy through fault conditions when it is not desired to isolate bus section 11. Since no operating torque will be provided by motor element 33 unless an actual ground fault occurs, only through or external faults involving ground will cause difficulty in this regard since, even though a differential current flows in winding 35 there must also be a polarizing current flowing in polarizing windings 34 before any operating torque on electroresponsive device 26 can be produced. Consequently, in order to prevent electroresponsive device or sensitive ground-fault differential relay 26 from operating on external ground faults, I provide means for producing a restraining torque for opposing the operating torque produced by motor element 33. To this end, I provide a motor element associated with disk 32 which comprises a magnetic structure 39 including a pair of shaded poles 40 disposed in spaced relationship to form an air gap therebetween within which induction disk 32 is adapted to move. A suitable energizing winding 41 is provided for magnetic structure 39. Since no restraining torque is necessary unless an actual ground fault exists on the system by virtue of the new and improved arrangement described above for applying an operating torque to the movable element of electroresponsive device 36, winding 41 need only be energized when ground current flows through conductor 21. Accordingly, in Fig. 1, I have illustrated winding 41 of the motor element for producing a restraining torque on rotatable shaft 27 as energized from the secondary winding of current transformer 37 in series with the polarizing windings 34 of motor element 33. With this arrangement, the restraining torque is proportional to a function of the ground current $I_G$ supplied by a grounding device associated with bus section 11.

Whenever an actual ground fault exists on the system including bus section 11, a restraining torque will be produced and applied to rotatable shaft 27. Whenever this restraining torque is larger than the operating torque produced by motor element 33, electroresponsive device 26 will be prevented from operating to energize the trip-controlling circuit which comprises an auxiliary multiple-contact tripping relay 42 which, when energized, closes a plurality of contacts 43, 44, and 45, which, in turn, cause simultaneous energization of the tripping circuits of circuit breakers 13, 18, and 14, respectively, to isolate bus section 11. As shown, the auxiliary tripping relay 42 is of the hand-reset type which, upon operating to close its contacts, deenergizes its own circuit at the contacts 46.

The operating torque applied to rotatable shaft 27 by motor element 33 may be expressed by the following equation:

$$T_O = K_1 I_D I_G \cos(\phi_{I_G} - \phi_{I_D} + \beta) \qquad (1)$$

where $T_O$ is the operating torque, $K_1$ is a constant, $I_D$ is the differential current flowing as evidenced by the current flowing in winding 35, $I_G$ is the ground current supplied by the grounding device associated with bus section 11 as evidenced by the current flowing in the secondary winding of current transformer 37, $\phi_{I_G}$ is the angular relationship between the ground current $I_G$ and a reference vector, $\phi_{I_D}$ is the angular relationship between the differential $I_D$ and a reference vector, and $\beta$ is the inherent phase angle of the motor element 33 of electroresponsive device 36, that is, the angle by which $I_D$ should lead $I_G$ for maximum operating torque.

The restraining torque produced by the motor element associated with induction disk 32 may be expressed by the following equation:

$$T_R = K_2 I_G^2 \qquad (2)$$

where $T_R$ is the restraining torque, and $K_2$ is a constant.

The balance point of electroresponsive device 26 is where the operating torque $T_O$ is just equal to the restraining torque $T_R$, which from Equations 1 and 2 may be expressed as follows:

$$K I_G = I_D \cos(\phi_{I_G} - \phi_{I_D} + \beta) \qquad (3)$$

where K is a new constant equal to $$\frac{K_2}{K_1}$$

Although, I have illustrated the winding 40 of the restraining circuit and the polarizing winding 34 of the operating circuit as energized in response to ground current, it should be understood that other means for obtaining a zero-sequence component might be utilized, such, for example, by means of potential transformers connected to bus section 11 so as to provide a zero-sequence potential. Such an arrangement eliminates the requirement of a grounding device associated with the protected section 11 if the system is otherwise grounded, although, where the zero-sequence potential is utilized, it is desirable that the total zero-sequence impedance of the system back of the bus remains substantially constant for various system setups.

As was mentioned above, in the case of a through fault involving ground, $I_D$ would equal zero if it were not for dissimilarities in the current transformers such as those due to ratio breakdown which will, of course, be a maximum in the set of current transformers carrying the total fault current flowing in the protected section. For example, if a double line-to-ground fault occurred on bus section 10, as shown in Fig. 1, then the ratio breakdown of certain of the current transformers designated by the numeral 23 with appropriate subscripts would be greater than in current transformers 24 and 25. It can readily be shown that the false differential current $I_D$ produced in the secondary windings of the current transformers is the resultant magnetizing current of all of the current transformers associated with the protected bus section and that this current $I_D$ will lag the ground current $I_G$. Assuming that the effective burden on these transformers in a differential connection is essentially resistive, which is a reasonable assumption, the magnetizing currents will lag the secondary currents by substantially ninety degrees and, if the magnetizing currents are relatively small with respect to the primary currents, then $I_D$ will lag $I_G$ by nearly ninety degrees. In other words, on an apparent fault condition due to current transformer ratio breakdown, the angular relationship between $I_D$ and $I_G$ will be such that the cosine function expressed in Equation 1 will be very small and, consequently, the operating torque will be small as contrasted with an actual ground-fault condition on bus section 11 where $I_D$ and $I_G$ are the same currents and would be in phase except for the additonal component of apparent fault current included in $I_D$ due to current transformer errors. It is obvious, therefore, that my sensitive ground-fault differential relay distinguishes between actual ground faults and apparent ground faults by the difference in phase angle between the ground current $I_G$ and the differential current $I_D$ in the two situations. On internal ground faults, by far the largest component of $I_G$ will be due to the actual ground current, and consequently, $I_D$ and $I_G$ will be substantially in phase so that the cosine function of Equation 1 above will be a maximum and a high operating torque will be produced on internal ground faults.

The greatest transformer breakdown will, of course, result on an external phase fault but since no operating torque would be produced on electroresponsive device 26 unless a ground is also involved, the external double line-to-ground fault will be considered to indicate one of the extreme conditions with which electroresponsive device 26 is required to cope. With a double line-to-ground fault on bus section 10 as indicated in Fig. 1, it may be assumed for purposes of simplified calculation that the ratio breakdown occurs only in current transformers 23B and 23c or in other words that the ratio breakdown of all the other current transformers involved is substantially negligible since they carry a smaller portion of the fault current. It should be noted that, on an internal fault condition, no single set of current transformers will be called upon to carry the total fault current which is more or less divided amongst all the transformers involved and, consequently, the false differential current will not be as great as in the case of an external fault. Referring now to Fig. 2a, I have illustrated the current conditions existing in the system when an external double-line-to-ground fault such as illustrated on bus section 10 exists and the impedance 22 in ground circuit 21 is substantially pure reactance. Neglecting load currents, the unfaulted A phase conductor will carry substantially no current and the B and C phase conductors will carry the current $I_C$ and $I_B$, respectively, which are substantially of equal magnitude but, due to the reactance grounding, are not 180 degrees out of phase. It is essentially true that, insofar as currents of the magnitude of fault currents are concerned, the positive and negative-phase-sequence impedances of the system may be considered as pure reactance. This is due to the fact that the resistive components are kept as small as possible to reduce losses. On a double line-to-ground fault with reactance grounding, and pure reactance phase sequence impedances the neutral of the voltage triangle is displaced symmetrically with respect to the faulted phases so that the currents $I_B$ and $I_C$ flowing in the B and C phase conductors are substantially equal. These currents $I_B$ and $I_C$ of Fig. 2a are obtained by summation of the positive, negative, and zero-phase-sequence currents flowing in the A, B, and C phase conductors, respectively, of bus section 11 adjacent current transformers 23 which are designated as $I_{A1}$, $I_{A2}$ and $I_{A0}$ respectively for the A phase conductor. The summation of these quantities is indicated best in Fig. 2e where the resulting currents $I_B$ and $I_C$ also shown in Fig. 2a are obtained, the current $I_A$ being zero due to the same summation.

Referring again to Fig. 2a and assuming that the magnetizing currents of the current transformers 23B and 23c lag the secondary currents by ninety degrees as was set forth above, the magnetizing current vector $I_{B_m}$ and the secondary current vector $I_{B_s}$ are illustrated, whose summation must equal $I_B$. Similarly, the magnetizing current $I_{C_m}$ and the secondary current $I_{C_s}$ of current transformer 23c must by vector addition equal $I_C$. It will be obvious from the above discussion that $I_B$ and $I_C$ are equal to the vector sum of all the other primary currents flowing in the current transformers 24 and 25 associated with the respective phase conductors, it being assumed that the magnetizing currents of all the other current transformers are negligible. Consequently, the differential current $I_D$ is equal to the vector sum of the magnetizing currents $I_{B_m}$ and $I_{C_m}$. The ground current $I_G$ flowing in ground conductor 21 is represented as substantially ninety degrees out of phase with the currents $I_B$ and $I_C$ by virtue of the reactance grounding, the angle being somewhat less than ninety degrees because, as was mentioned above, the reactance grounding causes the vectors $I_B$ and $I_C$ to be somewhat displaced from the 180 degree relationship. It will be noted from Fig. 2a that the magnitude and phase reationship of $I_D$ with respect to $I_G$ is the same as the relationship between the magnetizing currents $I_{B_m}$ and $I_{C_m}$ and the corresponding primary currents $I_B$ or $I_C$ of the current transformers in the faulted phases. The angular relationship is denoted by $\alpha$ in Fig. 2a.

In Figs. 3a, 3b, 3c, 3d, and 3e, the corresponding vector relationships are illustrated as in the Figs. 2a, 2b, 2c, 2d, and 2e for the system shown in Fig. 1 with an external double line-to-ground fault on section 10 as indicated except that the impedance 22 in ground conductor 21 is substantially pure resistance rather than substantially pure reactance. In this case, the current vectors $I_B$ and $I_C$ are 180 degrees out of phase, but the magnitude thereof is different due to the fact that the neutral displacement by virtue of a double line-to-ground fault is not along the current axis of the unfaulted phase as in the case of the reactance grounded system. The corresponding vectors of Fig. 3a are designated by the same subscripts as in Fig. 2a; and as will be observed, the ground current $I_G$ in this case is ninety degrees ahead of the ground current $I_G$ of Fig. 2a assuming that the zero phase sequence impedance of the system in substantially all embodied in impedance 22. The effect of the magnetizing currents of the other current transformers associated with the faulted phase conductors of the bus section 11 which was assumed to be negligible in calculating the vectors shown in Figs. 2a and 3a is to decrease the value of the differential current $I_D$. However, it also decreases the angle $\alpha$ by which $I_B$ lags $I_G$ thus nullifying to some extent the beneficial effect of the angular bias.

From the above discussion, it is obvious that with my new and improved sensitive ground-fault differential relay in which an operating torque proportional to the product of the current $I_G$ and the differential current $I_D$ is produced, false operation thereof is prevented by utilizing the different angular relationships between these currents which exist on an actual ground-fault condition as contrasted with the false differential current caused by an external fault.

The operation of the differential ground-fault protective system of Fig. 1 will be understood by those skilled in the art in view of the detailed description included above. The fact that no operating torque will be produced unless an actual ground fault exists eliminates one of the main sources of difficulty and providing a restraint only when ground faults occur together with the new and improved motor element for providing an operating torque eliminates substantially all other difficulties so that a sensitive differential ground relay is provided for use with systems having a high ground-fault impedance.

Although I have illustrated my invention as applied to the use of an induction disk type of differential relay, it should be understood that it may also be utilized with an induction-cup type relay and, accordingly, in Fig. 4, I have disclosed an electroresponsive device generally indicated at 50 which may be associated with the protective system of Fig. 1 only a portion of which is disclosed but which portion is designated by the same reference numerals as in Fig. 1. Electroresponsive device 50 is similar in construction to the electroresponsive device disclosed and claimed in United States Reissue Patent 21,813, assigned to the same assignee as the present application. As shown in Fig. 4, this device comprises a hollow magnetic stator having a plurality of inwardly projecting salients 51 to 58, inclusive, each provided with a winding designated by the corresponding reference numeral marked with a prime. The windings 52', 56', and 58' are energized with a current proportional to the differential current $I_D$ while the windings 51', 53', 54', 55', and 57' are energized with a current proportional to the ground current $I_G$. The windings 51', 53', 55', and 57' are the polarizing windings while the winding 54' is the restraining winding. The energization of the respective windings 51' to 58' of the electroresponsive device 50 is tabulated below:

| Windings | Energizing current |
|---|---|
| 51' | $+I_G$ |
| 52' | $+I_D$ |
| 53' | $-I_G$ |
| 54' | $-I_D$ |
| 55' | $+I_G$ |
| 56' | $+I_D$ |
| 57' | $-I_G$ |
| 58' | $-I_D$ |

The structural details of electroresponsive device 50 are clearly disclosed in the above-mentioned reissue patent and form no part of this invention so a detailed description thereof will not be included herein, this relay being only schematically shown. The windings 51' to 58' energize the salients 51 to 58 and also a central magnetic member 59 concentrically positioned with respect to the ends of the salients thereby to actuate a cup-shaped rotor 60 which is movable in the gaps between the salients and the stator 59. Rotor 60 is connected to a contact-controlling member 61 adapted to bridge contacts 62 which would control the energization of auxiliary trip-controlling relay 42 of Fig. 1. A suitable spring 63 continuously biases contact-controlling member 61 to the open circuit position. The salients 51, 53, 55, and 57 are provided with copper sleeves 64 around which the respective windings are wound and which function like shading coils. These copper sleeves cause the air gap flux to lag the total flux including the leakage flux, thereby producing the desired phase shift necessary to produce the respective operating and restraining torques on rotor 60.

With the arrangement disclosed in Fig. 4, the poles 53, 54, and 55 carry a flux which interacts in such a manner as to produce a restraining torque on rotor 60 proportional to $I_G^2$. The salients 51, 52, 53, 55, 56, 57, and 58 carry fluxes which interact to produce an operating torque proportional to the product of $I_G$ and $I_D$ so that electroresponsive device 50 of Fig. 4 operates in substantially the same manner as electroresponsive device 26 of Fig. 1.

In order to control the restraining torque, it may be desirable to provide an autotransformer such as 65 of Fig. 4 so that the energization of restraining winding 54' might be controlled. Preferably, however, this may be controlled by varying the number of turns in winding 54'.

The operation of a protective system embodying an electroresponsive device such as 50 of Fig. 4 is similar to that of the protective system disclosed in Fig. 1 and no further discussion will be included herewith.

While I have described particular embodiments of my invention, it will be obvious to those skilled in the art that various changes and modifications may be made without departing from my invention and I, therefore, aim in the appended claims to cover all such changes and modifications as fall within the true spirit and scope of my invention.

What I claim as new and desire to secure by Letters Patent of the United States, is:

1. In a differential ground-fault protective system for an alternating-current circuit, a circuit control device, means responsive to a function of the product of the ground current and the differential current of said circuit for actuating said control device, and means responsive to the ground current for opposing the actuation of said control device.

2. In an electroresponsive device for protecting a portion of an alternating-current system against ground faults thereon, a rotatable member, and means for exerting thereon a torque substantially proportional to the product $I_D I_G$ and an opposing torque substantially proportional to $I_G$ where $I_G$ is the ground current flowing in said portion of said system and $I_D$ is the differential current.

3. A differential ground-fault protective system responsive to ground faults on an electric circuit for causing operation of a control device when an actual ground fault exists on said circuit comprising an electroresponsive device including a movable member, means for exerting an operating torque on said member substantially proportional to the product of the ground current flowing in said circuit and the differential current of said circuit so that operation of said electroresponsive device will occur only when actual ground-fault current flows in said circuit and said electroresponsive device is capable of distinguishing between actual ground faults on said circuit and external faults which cause a false differential current to flow by the angular relationship between the ground current and the differential current, and means for exerting a torque proportional to the ground current flowing in said circuit on said member in opposition to said operating torque.

4. In a protective system for an electric circuit, a device to be operated upon the occurrence of a ground fault on said circuit, means responsive to the product of the actual ground current flowing in said circuit and a current proportional to the difference between the currents entering and leaving said circuit for causing operation of said device, and means responsive to ground current flowing in said circuit for opposing said first-mentioned means on fault conditions external to said electric circuit.

5. In a protective system for an electric circuit, a device to be operated upon the occurrence of a ground fault on said circuit, means responsive to the product of the actual ground current flowing in said circuit and a current proportional to the difference between the currents entering and leaving said circuit for causing operation of said device, and means responsive solely to ground current flowing in said circuit for also controlling the operation of said device.

6. In a ground-fault protective arrangement for an alternating-current system having a plurality of terminals through which current normally enters and leaves said system, current transformer means associated with said terminals, an electroresponsive device having a pair of torque-producing means associated therewith, one of said torque-producing means including a wattmeter element having a plurality of windings, means including said current transformer means for energizing one of said windings of said one torque-producing means in accordance with the difference between the ground currents flowing at said terminals, means for energizing another winding of said one torque-producing means in accordance with the actual ground current flowing in said circuit, and means for energizing the other of said torque-producing means in response to the actual ground current flowing in said circuit.

7. In a ground-fault protective arrangement for an alternating-current system, having a plurality of terminals through which current normally enters and leaves said system, current transformer means associated with said terminals, a ground connection for said system, an electroresponsive device having a pair of torque-producing means associated therewith, one of said torque-producing means including a wattmeter element having a plurality of windings, means including said current transformer means for energizing one of said windings of said one torque-producing means in accordance with the difference between the ground current flowing at said terminals, means for energizing another winding of said one torque-producing means in accordance with the current flowing in said ground connection, and means for energizing the other of said torque-producing means in response to the current flowing in said ground connection.

8. In a ground-fault protective arrangement for an alternating-current system, having a plurality of terminals through which current normally enters and leaves said system, current transformer means associated with said terminals, a ground connection for said system, an electroresponsive device having an operating torque-producing means and a restraining torque-producing means associated therewith, said operating torque-producing means including a wattmeter element having a plurality of windings, means including said current transformer means for energizing one of said windings of said operating torque-producing means in accordance with the difference between the ground current flowing at said terminals, means for energizing another winding of said operating torque-producing means in accordance with the current flowing in said ground connection, and means for energizing said restraining torque-producing means in response to the current flowing in said ground connection.

JOHN H. NEHER.

CERTIFICATE OF CORRECTION.

October 10, 1944.

Patent No. 2,360,151.

JOHN H. NEHER.

It is hereby certified that error appears in the printed specification of the above numbered patent requiring correction as follows: Page 1, first column, line 21, after the word "faults" insert a period; page 5, first column, line 64, in the table, second column thereof, opposite " 54' ", for " $-I_D$ " read -- $-I_G$ --; and that the said Letters Patent should be read with this correction therein that the same may conform to the record of the case in the Patent Office.

Signed and sealed this 16th day of January, A. D. 1945.

Leslie Frazer

Acting Commissioner of Patents.

(Seal)